Jan. 17, 1956     H. H. HANSEN ET AL     2,731,534
FLUID PRESSURE ACTUATOR FOR MACHINE COMPONENTS
Filed Feb. 26, 1948     2 Sheets-Sheet 2
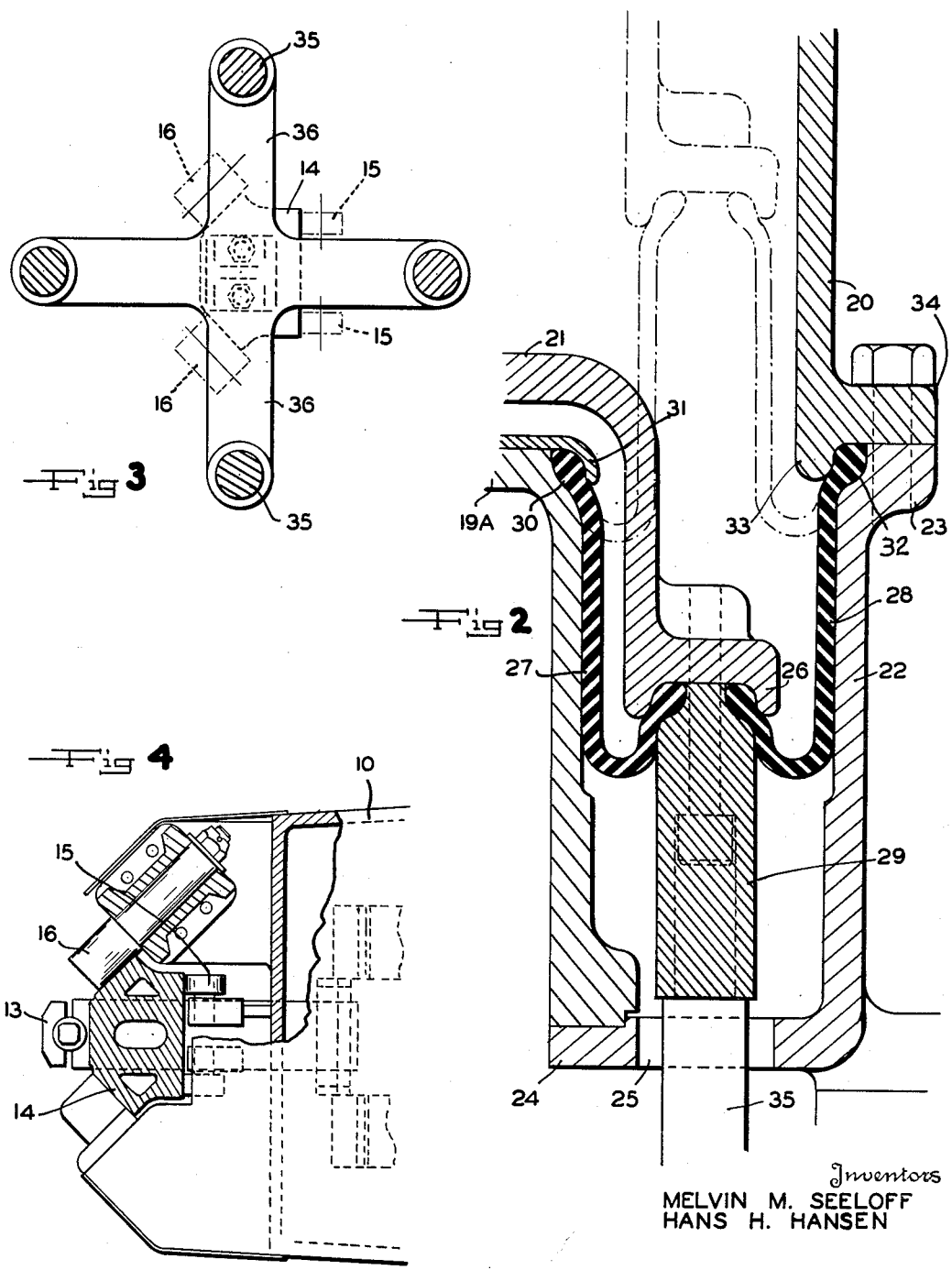
Inventors
MELVIN M. SEELOFF
HANS H. HANSEN ical and inexpensive fluid pressure actuated motor operative to effect linear or reciprocating motion in a machine element in a frictionless manner and with a minimum of starting and operating inertia whereby the driven element may be actuated in a smooth continuous manner while being extremely sensitive to factors of control or to variations in the resistance to movement encountered. It is a further object of the invention to provide an improved fluid pressure motor having the characteristics outlined which is double-acting in its operation whereby the connected driven element may be moved in either direction with the power supplied by the pressure in the employed fluid. These general objects are accomplished by our invention through the employment of flexible floating bellows rings, the peripheral edges of which are securely clamped to fixed and movable members while the intermediate portions of the rings are free to flex axially upon relative axial movement of the fixed and movable members in response to the admission between said members of fluid under pressure. Thus, the fluid sealing is accomplished by the freely flexing rings and in this manner a double-acting fluid motor of appreciable stroke may be provided without the use of stuffing glands which in the case of air operated cylinders, particularly, make for erratic movement responses of the connected driven element.

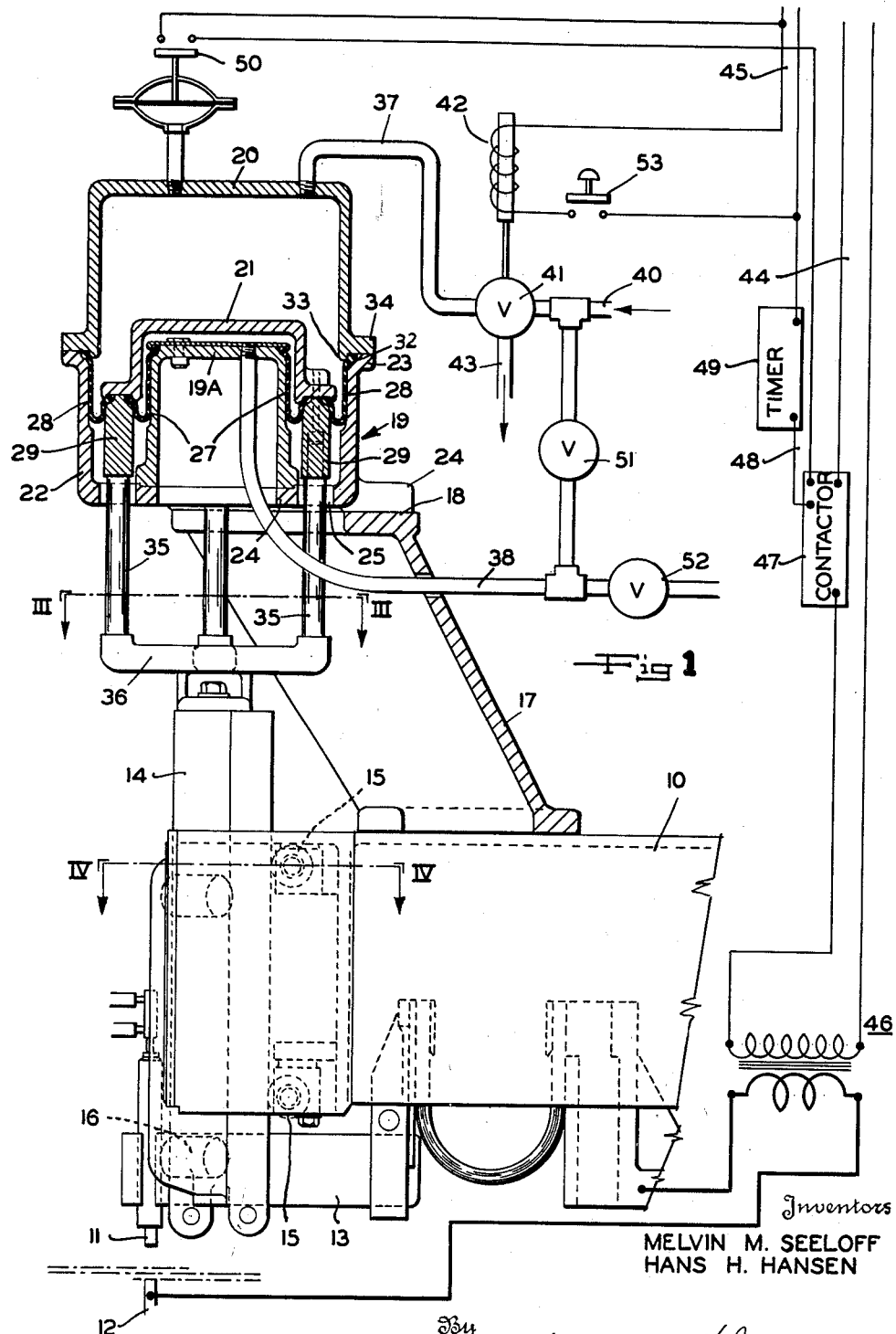

United States Patent Office 2,731,534
Patented Jan. 17, 1956

2,731,534

FLUID PRESSURE ACTUATOR FOR MACHINE COMPONENTS

Hans H. Hansen and Melvin M. Seeloff, Warren, Ohio, assignors to The Taylor-Winfield Corporation, Warren, Ohio, a corporation of Ohio Application February 26, 1948, Serial No. 11,302

6 Claims. (Cl. 219—4)

This invention relates to fluid motors generally and more particularly to an improved fluid pressure motor for effecting linear or reciprocating motion in a machine component as a tool carrying slide or as a ram supporting an electric resistance welding electrode, for example. The primary object of the invention is the provision of a practical and inexpensive fluid pressure actuated motor operative to effect linear or reciprocating motion in a machine element in a frictionless manner and with a minimum of starting and operating inertia whereby the driven element may be actuated in a smooth continuous manner while being extremely sensitive to factors of control or to variations in the resistance to movement encountered. It is a further object of the invention to provide an improved fluid pressure motor having the characteristics outlined which is double-acting in its operation whereby the connected driven element may be moved in either direction with the power supplied by the pressure in the employed fluid. These general objects are accomplished by our invention through the employment of flexible floating bellows rings, the peripheral edges of which are securely clamped to fixed and movable members while the intermediate portions of the rings are free to flex axially upon relative axial movement of the fixed and movable members in response to the admission between said members of fluid under pressure. Thus, the fluid sealing is accomplished by the freely flexing rings and in this manner a double-acting fluid motor of appreciable stroke may be provided without the use of stuffing glands which in the case of air operated cylinders, particularly, make for erratic movement responses of the connected driven element.

A further and more specific object of the invention is the provision of a double-acting fluid pressure operated motor having substantially no operating friction and a minimum of starting and operating inertia which is of a differential nature as regards the force developed in opposite directions when both ends of the units are supplied with air or other fluid pressure from a common source whereby controlled reciprocation of the connected driven element may be effected simply by controlling the admission and exhaustion of air from one end of the power unit.

Another object of the invention is the provision of an improved assembled sliding element and operator therefor especially useful in resistance welder and other machine applications whereby the design and construction of such welders and other machines may be materially simplified and have more effective and more controllable operating characteristics. The frictionless double-acting fluid motor of our invention is extremely simple in design and construction and through utilization of the guiding provided by the connected rectilinearly movable machine element a most inexpensive and practical driving arrangement for such element is provided which possesses definite advantages in operating characteristics as will more fully appear hereinafter.

Another more specific object of the invention is the provision of a substantially simplified and improved actuating system for an electrode in an electric resistance welding machine.

The above and other objects and advantages of the invention will become apparent upon consideration of the following detailed specification and the accompanying drawing wherein there is shown a preferred embodiment of the invention as applied, for illustration purposes, to an electric resistance welding machine.

In the drawing:

Figure 1 is a schematic view of a spot welder employing the improved fluid pressure operated motor of our invention;

Figure 2 is a fragmentary vertical section, on an enlarged scale, through the fluid pressure motor of Figure 1; and, Figures 3 and 4 are horizontal sectional views taken along the lines III—III and IV—IV, respectively, of Figure 1.

Referring to the drawing in detail, reference numeral 10 represents a portion of the fixed frame of a machine and in the illustrated use of the invention the machine is a spot welder having a movable electrode 11 and a normally fixed electrode 12. The latter electrode is normally carried by a rigid support fixed with relation to the frame 10 as is well understood in the art. Electrode 11 is detachably but rigidly secured to a current conductive mounting member 13 which in turn is rigidly clamped to the bottom end of a vertically disposed ram or slide 14. The slide 14 is anti-frictionally guided by means of the rollers 15 and 16 which engage angularly disposed planed surfaces on the ram 14. It will be understood that because of the vertically spaced arrangement of the rollers 15 and of the rollers 16 the ram 14 will be accurately guided in a vertical sliding direction. The means to move the ram 14 up and down which is the principal point of novelty of the present invention will now be described in detail.

Extending upwardly and forwardly of the frame 10 is a bracket 17 having a horizontally disposed upper surface 18 to which is rigidly secured in upstanding relation the improved fluid pressure actuated motor of our invention. This fluid motor comprises essentially a lower assembly comprised of parts 19 and 19A, an inverted cup-shaped upper member 20 and a smaller inverted cup-shaped member 21 adapted to rise and fall within the member 20 upon operation of the motor device. The part 19 has a cylindrical outer wall 22 flanged at its upper end as at 23 and having integral radially outward extending mounting feet 24 for attachment to the surface 18 of the bracket 17. Extending radially inward from the lower end of the tubular portion 22 is a wide flange 24 having four circumferentially spaced apertures 25 disposed therein. The part 19A is an inverted cup-shaped member having its rim rigidly secured to the inner edge of the flange 24 and it will be obvious from an inspection of Figures 1 and 2 that a substantial portion of the upper end of the part 19A is loosely nested in the part 21 when the latter is in lowermost position.

Part 21 is formed with a heavy rim in which is provided a wide downwardly opening groove 26 to receive the peripheral outer edge portion of a flexible diaphragm ring 27 and the peripheral inner edge portion of a second flexible diaphragm ring 28. Such edge portions of the rings 27 and 28 are beaded as shown and of course, the corners of the grooves 26 are rounded complementary to the curvature of these beaded edge portions. To securely clamp the adjacent edge portions of the rings 27 and 28 to the member 21 and to provide an operating connection for the member 21 we provide a ring 29 which is in the nature of a thick-walled tubular section and which has its upper edge securely clamped to the enlarged rim of the member 21. It should also be noted that the upper edge of the ring 29 is formed to provide curved surfaces generally complementary to the curvature of the beads on the adjacent edges of the rings 27 and 28 so that there is provided, in effect, circumferentially extending recesses for receiving and retaining in fluid type relation the peripheral beads of the rings 27 and 28.

The inner peripheral edge of the ring 27 is also beaded and the upper outer edge of the member 19A is recessed circumferentially as shown at 30 to receive this bead of the ring 27. A clamping plate 31 having a downturned peripheral flange for engaging over the outside of the adjacent bead of the ring 27 is rigidly secured to the top wall of part 19A. The outer peripheral edge of the flexible diaphragm ring 28 is also beaded and for receiving a substantial portion of this bead the upper inner edge of the part 19 is recessed circumferentially as shown at 32. To securely clamp the outer bead of the ring 28 in the recess 32 the member 20 is formed with a downwardly extending annular lip 33 which engages the inner side of the outer bead to force and retain this bead in the recess 32. As shown, the part 20 is provided with an outwardly extending flange 34 which is rigidly secured to the flange 23 of the part 19 to assemble the apparatus.

Extending through the apertures 25 of the flange 24 are four circumferentially spaced rods 35 which are rigidly connected at their upper ends to the ring 29 and at their lower ends to a spider 36 which in turn is rigidly secured to the upper end of the ram 14. Now it should be clearly understood that since the spider 36 is rigidly connected to the ram 14 and since the intermediate member 21 of the fluid motor assembly is rigidly connected to the spider 36 through the rods 35 and ring 29 the member 21 will be effectively guided in its up and down movement by the action of the ram 14 and in actual practice the parts will be so dimensioned and adjusted that the part 21 will float up and down in the cylindrical member 20 along a path of travel concentric with the longitudinal axis of the assembly whereby the severity of flexure of the diaphragm rings 27 and 28 will remain substantially equal as regards each other and substantially uniform throughout the whole range of movement of the part 21.

Fluid, preferably air under pressure may be admitted to the top housing 20 by means of the conduit 37, for example, and another conduit 38 may conduct fluid under pressure to the space in the assembly between the parts 19A and 21. Now it will be obvious that the downward thrust on the member 21 and consequently on the ram 14 will be proportional to the pressure of the fluid furnished the housing 20 and to the effective cross-sectional area of the downwardly movable assembly acted on by this pressure in a downward direction. The upward thrust exerted on the member 21 and consequently on the ram 14 by means of the fluid pressure existent in the conduit 38 is proportional to the fluid pressure and to the effective cross-sectional area of the movable assembly acted on by the pressure in an upward direction. Since the first mentioned cross-sectional area may be two or three times the second mentioned cross-sectional area the member 21 will be moved down rapidly if equal pressures are furnished the conduits 37 and 38 and for this reason the ram 14 may be raised and lowered simply by alternately exhausting and supplying fluid pressure to the conduit 37. This may be a desirable method of control in certain installations and, of course, the provision of smaller capacity in the power space below the member 21 may be advantageous in other installations in securing a rapid retraction movement of the connected machine element as the ram 14, for example. However the motor of our invention is connected to the fluid source and controlled, the simplicity of construction and operational advantages of the motor should be understood and appreciated. First, as far as the motor itself is concerned the same is substantially frictionless in operation and its movable elements are small in size and light in weight so that a minimum of inertia is required to be overcome in accelerating or decelerating the unit. These advantages accrue largely through the elimination of the conventional piston and rings and through the elimination of the conventional packing glands but the design of the apparatus is such that a substantial length of operating stroke is made possible. To demonstrate the advantages of the invention as applied to an electric resistance spot welder the illustrated application of the invention will now be described.

Reference numeral 40 represents a source of controlled air pressure and interconnecting the source 40 and the conduit 37 is a three-way valve 41 arranged to be actuated by a solenoid 42 and having an exhaust port 43. A commercial source of welding current is represented by line 44 and the source of controlled current is represented by a line 45. The welding transformer 46 has its secondary connected to the electrodes 11 and 12 and its primary is arranged to be energized from the line 44 through a suitable automatic contacting device 47 under the control of a circuit 48 in which is incorporated a timer 49. Also in the control circuit 48 is a pressure responsive switch 50 which closes when the air pressure in the housing 20 has built up to an adequate welding pressure. The air source 40 is connected with the conduit 38 by means of a normally open manually controlled valve 51 and a normally closed exhaust valve 52 is also connected with the conduit 38. A manual switch 53 is provided to energize solenoid 42 whereby the source 40 is connected with the conduit 37. Upon de-energization of the solenoid 42 the valve 41 operates to connect conduit 37 with the exhaust port 43.

At the start of a cycle of operation with the solenoid 42 and the welding transformer de-energized the operator may close the switch 53 which brings the ram 14 downwardly to move the electrode 11 into pressure engagement with the work. Upon adequate resistance to further downward movement of the electrode being encountered the pressure in housing 20 builds up sufficiently to close switch 50 to energize the circuit 48, thus operating the contactor 47 and at a pre-determined later time the timer 49 operates to de-energize the circuit 48, thus de-energizing the welding transformer 46 after which the operator may release the switch 53 to exhaust the air from the housing 20 thereby allowing the air in the power chamber below the part 21 to raise the part 21 and retract the electrode 11. The fluid motor of our invention is particularly advantageous in resistance welding machines since the absence of friction and low inertia in the motive means enables the electrode to follow through quite quickly upon softening of the metal whereby a dense weld of consistently high quality is obtained. In some installations it is desirable to effect a rapid transition from normal welding pressure to a higher forging pressure at a pre-determined time during the welding cycle and in our system this may be accomplished by replacing the valve 52 with a normally closed quick acting solenoid valve which may be energized at a proper time during the welding cycle to very rapidly exhaust the air from the power chamber below the member 21 thus allowing the downward thrust to increase very rapidly. Here again, the low inertia and absence of friction in the motive unit will allow the output of the same to follow very precisely and quite closely the indicated control.

The ring 29, in addition to securing the peripheral edges of the diaphragm ring 27 and 28 and providing means to interconnect the member 21 with the machine element to be driven, performs the further important function of providing a backing for the material of the rings 27 and 28 as the member 21 moves upwardly. This allows the rings 27 and 28 to be constructed of quite thin flexible material for maximum movement response and, in addition, insures substantially uniform operating characteristics throughout the whole length of stroke of the member 21 and connected elements.

Another important advantage of the power unit of our invention is that in the construction of the same no sliding fits or close tolerances are required whereby it is possible to produce entirely practical and satisfactory power units for effecting reciprocating or rectilinear movement in machine components in commercial quantities at very reasonable cost.

The above specifically described embodiment and application of our invention should be considered as illustrative only as obviously many changes may be made therein without departing from the spirit or scope of the invention. Reference should therefore be had to the appended claims in determining the scope of the invention.

We claim:

1. Apparatus of the character described comprising in combination a machine element guided for rectilinear movement in opposite directions, a double acting fluid motor aligned with said machine element and having a cup-shaped fluid-impervious member spaced from but rigidly connected to said machine element and disposed transversely of the axis of movement of said machine element, said member having a lip about its open end, a fixed cup-shaped housing encircling said member and extending outwardly therefrom to form a pressure chamber, a second fixed cup-shaped housing nested within said member to form therewith a second pressure chamber, an annular flexible diaphragm ring having its outer edge secured to the side wall of said first mentioned housing and its inner edge secured to the lip of said member to render said first mentioned chamber fluid-tight, a second annular flexible diaphragm ring having its outer edge secured to the lip of said member and its inner edge secured to said second mentioned housing to render said second mentioned chamber fluid-tight, and means to conduct fluid under pressure into said chambers.

2. Apparatus of the character described comprising in combination a slide guided for rectilinear movement in opposite directions, a fixed cup-shaped housing aligned with the axis of movement of said slide and having its transverse wall furthest removed from said slide, a cup-shaped member movable and centrally disposed in said housing and having its open end projecting toward said slide, said member having a lip about its open end, means rigidly connecting said lip to said slide, an annular flexible diaphragm ring having its outer edge secured to the side wall of said housing and its inner edge secured to said lip to provide a first fluid-tight pressure chamber between said housing and said member, a second fixed cup-shaped housing nested within said member with its transverse wall outwardly of said slide, a second annular flexible diaphragm ring having its outer edge secured to said lip and its inner edge secured to said second housing to provide a second fluid-tight pressure chamber between said member and said second housing, and means to conduct fluid under pressure into said chambers.

3. Fluid-pressure-operated actuating apparatus for a rectilinearly guided machine component comprising fixed nested inner and outer cup-shaped housings axially aligned with respect to the axis of movement of said component, a cup-shaped member nesting over said inner housing and movable centrally and longitudinally in said outer housing, said member having a lip about its open end, an inner annular flexible diaphragm ring having its inner edge secured to the closed end of said inner housing and its outer edge secured to the lip of said member, an outer annular flexible diaphragm ring having its outer edge secured to the side wall of said outer housing intermediate the ends thereof and having its inner edge secured to the lip of said member, means to rigidly connect said lip to said component, and means to conduct fluid under pressure to the pressure chambers provided by said housings and rings on opposite sides of said member, the arrangement being such that when said member is furthest removed from the transverse wall or closed end of said outer housing a substantial portion of the material of said outer ring overlies the inner surface of the side wall of said outer housing in flat engagement therewith while a substantial portion of the material of said inner ring overlies the outer surface of the side wall of said inner housing in flat engagement therewith.

4. Apparatus according to claim 3 further including a cylindrical member secured to said lip and projecting toward said component, the cylindrical inner surface of said cylindrical member and the outer cylindrical surface of said cylindrical member forming backings to receive the material of said inner and outer rings, respectively, upon movement of said first mentioned member further into said outer housing.

5. A fluid-pressure-operated actuating mechanism comprising relatively fixed nested inner and outer cup-shaped housings, a cup-shaped member nesting over said inner housing and movable centrally and longitudinally in said outer housing, an inner annular flexible diaphragm ring having its inner edge secured to said inner housing and its outer edge secured to said member to form a first pressure chamber, an outer annular flexible diaphragm ring having its outer edge secured to the side wall of said outer housing and having its inner edge secured to said member to form a second pressure chamber, the inner edge of said inner ring being secured to the closed end of said inner housing while the outer edge of said inner ring is secured to the open end of said member, means comprising a ring secured to said open end and positioned radially intermediate said inner and outer housings to provide a mechanical driving interconnection, said last mentioned ring being operative to clamp the outer edge of said inner diaphragm ring to said open end, and means to conduct fluid under pressure to said pressure chambers.

6. A movable electrode assembly for a low-inertia resistance welding machine having quick weld follow-up characteristics, comprising an elongated housing having a longitudinal opening therethrough, a reciprocable slide member housed within said opening and carrying a movable electrode extending from one end of said housing, said slide member having a transverse size less than that of said opening, a plurality of rollable members spaced radially about and also spaced longitudinally of said slide member and having rolling contact therewith, said rollable members maintaining said slide member in axial position relative to said housing and providing for ant-friction axial reciprocation of said slide member within said housing opening, a cylinder mounted on the end of said housing opposed to said electrode and having an aperture for introducing fluid pressure thereinto, a lightweight piston disposed within said cylinder and connected to said slide member, said piston having a diameter less than that of said cylinder to eliminate frictional contact between the opposing walls thereof, and a flexible diaphragm connected at its opposite ends to said piston and cylinder respectively so that fluid pressure entering said cylinder will move said piston and slide member in a direction toward the work to be welded with a minimum of resistance, whereby the end of the movable electrode will follow up the receding work surface as such surface softens under the heat generated by the welding current.

References Cited in the file of this patent

UNITED STATES PATENTS

| | | | |
|---|---|---|---|
| 368,089 | Hinds | Aug. 9, | 1887 |
| 377,858 | Lawrence | Feb. 14, | 1888 |
| 549,800 | Lipkowski | Nov. 12, | 1895 |
| 1,414,835 | Spohrer | May 2, | 1922 |
| 1,501,331 | Gulick | July 15, | 1924 |
| 1,751,277 | Karibo | Mar. 18, | 1930 |
| 1,781,189 | Nilson | Nov. 11, | 1930 |
| 1,786,912 | Madden | Dec. 30, | 1930 |
| 2,140,458 | Kuskin | Dec. 13, | 1938 |
| 2,200,305 | Sauzedde | May 14, | 1940 |
| 2,349,846 | Corin | May 30, | 1944 |
| 2,450,160 | Price | Sept. 28, | 1948 |

FOREIGN PATENTS

| | | |
|---|---|---|
| 3,058 | Great Britain | 1884 |